United States Patent
Ahn et al.

(10) Patent No.: US 9,467,556 B2
(45) Date of Patent: Oct. 11, 2016

(54) MODE SWITCHING METHOD FOR MOBILE TERMINAL

(75) Inventors: Da Le Ahn, Seoul (KR); Jae Woo Yeo, Seoul (KR); Sung Han Kim, Seoul (KR); Kyu Ok Choi, Seoul (KR)

(73) Assignee: Samsung Electronics Co., Ltd (KR)

( * ) Notice: Subject to any disclaimer, the term of this patent is extended or adjusted under 35 U.S.C. 154(b) by 1612 days.

(21) Appl. No.: 11/775,744

(22) Filed: Jul. 10, 2007

(65) Prior Publication Data

US 2008/0045207 A1   Feb. 21, 2008

(30) Foreign Application Priority Data

Aug. 16, 2006  (KR) .................. 10-2006-0077315

(51) Int. Cl.
*H04Q 7/20* (2006.01)
*H04M 1/725* (2006.01)

(52) U.S. Cl.
CPC ....... *H04M 1/7258* (2013.01); *H04M 1/72522* (2013.01); *H04M 2250/12* (2013.01)

(58) Field of Classification Search
CPC .... H04M 1/0208; G01F 1/16; G01F 1/1626; G01F 1/1684
USPC .............. 455/556.1, 566; 345/156, 168
See application file for complete search history.

(56) References Cited

U.S. PATENT DOCUMENTS

| 2002/0021278 | A1* | 2/2002 | Hinckley et al. | 345/156 |
| 2005/0068292 | A1* | 3/2005 | Duarte et al. | 345/156 |
| 2005/0219220 | A1* | 10/2005 | Kishi et al. | 345/169 |
| 2007/0004451 | A1* | 1/2007 | C. Anderson | 455/556.1 |
| 2007/0010286 | A1* | 1/2007 | Luke et al. | 455/556.1 |
| 2008/0231602 | A1* | 9/2008 | Kusuda et al. | 345/168 |

FOREIGN PATENT DOCUMENTS

| KR | 1020060057045 | 5/2006 |
| KR | 100612997 | 8/2006 |

* cited by examiner

*Primary Examiner* — William Nealon
(74) *Attorney, Agent, or Firm* — The Farrell Law Firm, P.C.

(57) ABSTRACT

A mode switching method and a mobile terminal operating with the mode switching method capable of switching an operation mode in accordance with a geographic placement attitude of the mobile terminal are disclosed. A mobile terminal includes a placement attitude detection unit for capturing a placement attitude of the mobile terminal; a placement attitude retrieval unit for comparing a captured geographic placement attitude with previously stored reference placement attitudes and outputting a mode signal corresponding to a reference placement attitude matching the captured placement attitude; a key arrangement configuration unit for reconfiguring a key arrangement according to the mode signal; a control unit for switching to an operation mode indicated by the mode signal and determining a rotation of a screen image; and a display unit for displaying the screen image at different angle adaptive to the placement attitude of the mobile terminal under the control of the control unit.

2 Claims, 12 Drawing Sheets

FIG. 4

| KEY BUTTON (21) | KEY VALUE (23) |
|---|---|
| 1 | • |
| ⋮ | ⋮ |
| 5 | ‖ |
| 6 | • |
| 7 | ◂◂ |
| 8 | ▸ |
| 9 | ▸▸ |
| 0 | ■ |

20

25

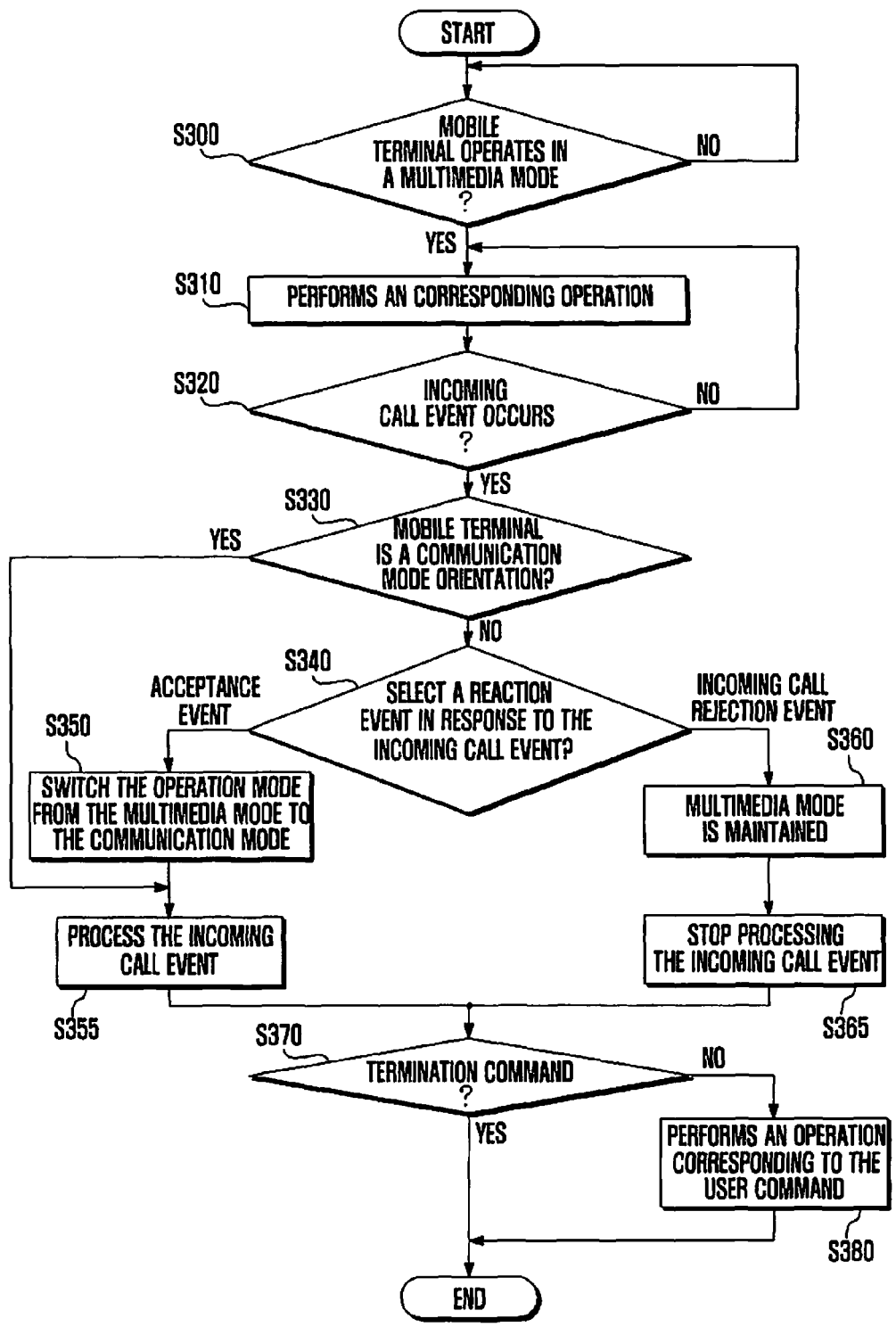

MODE SWITCHING METHOD FOR MOBILE TERMINAL

PRIORITY

This application claims priority under 35 U.S.C. §119(a) to a Korean Patent Application entitled "MODE SWITCHING METHOD FOR MOBILE TERMINAL" filed in the Korean Intellectual Property Office on Aug. 16, 2006 and assigned Serial No. 2006-0077315, the contents of which are incorporated herein by reference.

BACKGROUND OF THE INVENTION

1. Field of the Invention

The present invention relates to a mobile terminal, and in particular, to a mode switching method for a mobile terminal capable of switching an operation mode according to an orientation (i.e., posture or placement attitude) of the mobile terminal.

2. Description of the Related Art

Typically, a mobile phone provides various menu screens through a display user interface in order to allow mobile phone user's to conveniently select various mobile phone functions and options.

Today, as the integration of various mobile phone functions has increased, the depth of the hierarchical menus of a mobile phone has also increased, which in turn has produced greater overall user-convenience when a user executes a given tasks.

For example, today's mobile phones typically integrate several functions together such as alarm setting, time and date scheduling, audio filter playback, camera/photo, and digital multimedia broadcast reception functions.

In this case, assuming that an audio playback function is a sub-function of a multimedia function, generally, a user must select a multimedia function menu to reach an audio playback menu. However, such an increase of key manipulation complexity for executing a specific function can substantially limit the user's overall usability of other useful mobile phone functions.

SUMMARY OF THE INVENTION

An aspect of present invention is to address at least the problems and/or disadvantages and to provide at least the advantages described below. Accordingly, one aspect of the present invention is to provide a mobile phone and switching method thereof capable of switching an operation mode according to an orientation of the mobile phone. According to another aspect of the present invention, there is provided a mobile phone and switching method thereof capable of executing a specific command in accordance with an orientation of the mobile phone by mapping an orientation of the mobile phone to a key sequence generating the corresponding command.

According to another aspect of the present invention, there is provided a mobile terminal. The mobile terminal includes an orientation detection unit for capturing an orientation of the mobile terminal; an orientation retrieval unit for comparing a captured orientation with previously stored reference orientations and outputting a mode signal corresponding to a reference orientation matching the captured orientation; a key arrangement configuration unit for reconfiguring a key arrangement according to the mode signal; a control unit for switching to an operation mode indicated by the mode signal and determining a rotation of a screen image; and a display unit for displaying the screen image at different angle adaptive to the orientation of the mobile terminal under the control of the control unit.

According to another aspect of the present invention, there is provided a mode switching method for a mobile terminal. The mode switching method include capturing an orientation of the mobile terminal using an orientation sensor; comparing a captured orientation with previously stored reference orientations; enabling an operation mode corresponding to a reference orientation matching the captured orientation; and configuring a key arrangement corresponding to the operation mode.

According to another aspect of the present invention, there is provided a mode switching method for a mobile terminal. The mode switching method includes capturing an orientation of the mobile terminal using an orientation sensor; configuring, if the captured orientation indicates the multimedia mode, a key arrangement corresponding to the multimedia mode; determining whether an incoming call event occurs while operating in the multimedia mode; checking, if an incoming call event occurs, whether the orientation of the mobile terminal is suitable for the communication mode; switching, if the orientation of the mobile terminal is suitable for the communication mode, to the communication mode to process the incoming call event; and maintaining, if the orientation of the mobile terminal is not suitable for the communication mode, the multimedia mode to reject the incoming call event.

BRIEF DESCRIPTION OF THE DRAWINGS

The above and other objects, features and advantages of the present invention will be more apparent from the following detailed description in conjunction with the accompanying drawings, in which:

FIG. 4 shows a key-mapping table adopted for a mode switching method according to the present invention;

FIG. 8 is a flowchart illustrating a mode switching method according to the present invention;

DETAILED DESCRIPTION OF EXEMPLARY EMBODIMENTS

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

In the present invention, the mode switching method is described with two operation modes: multimedia mode and communication mode.

The mobile terminal performs various multimedia operations such as audio file playback, digital multimedia broadcast playback, camera/photo function, and the like, in the multimedia mode, and performs communication-related operations such as call reception and transmission, and message reception and transmission.

The mobile terminal of the present invention operates in one of two (2) modes: the multimedia mode and communication mode.

Figure 1:
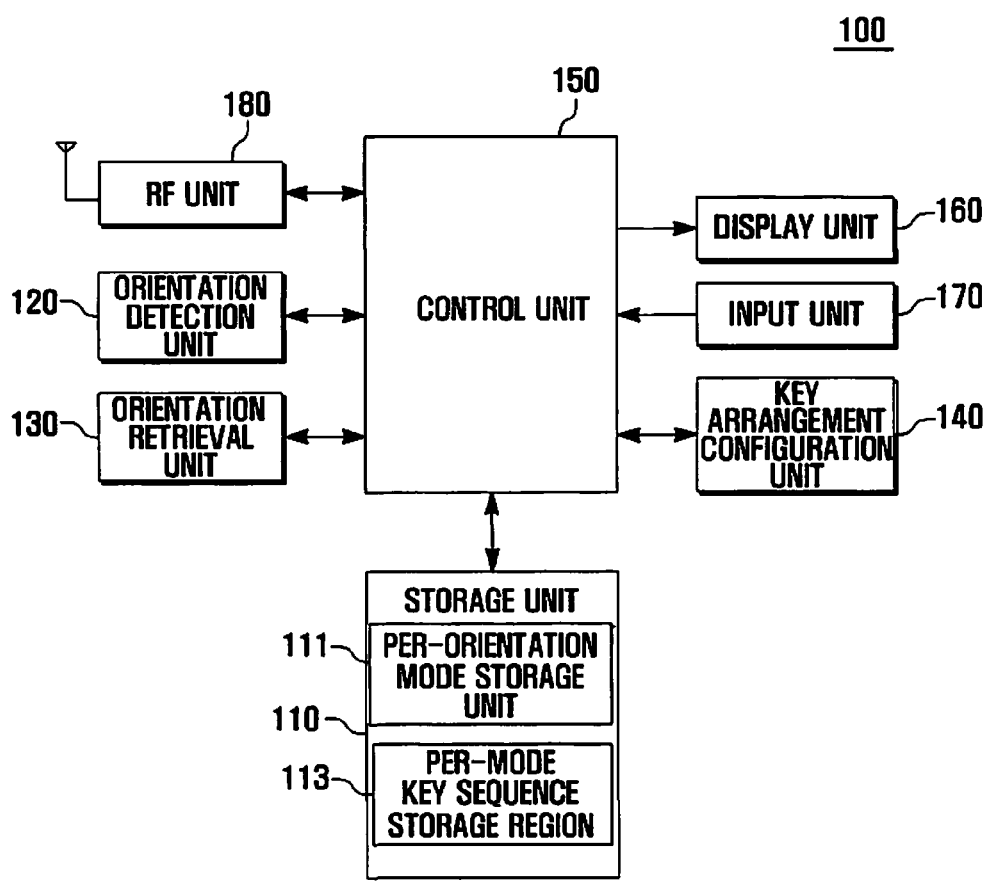
FIG. 1 is a block diagram illustrating a configuration of a mobile terminal according to the present invention.

FIG. 1 is a block diagram illustrating a configuration of a mobile terminal according to an exemplary embodiment of the present invention.

In FIG. 1, the mobile terminal includes a storage unit 110, an orientation detection unit 120, an orientation retrieval unit 130, a key arrangement configuration unit 140, a control unit 150, a display unit 160, and a Radio Frequency (RF) unit 180.

The storage unit 110 includes a program memory storing application program for executing operations and operating status of the mobile phone and a data memory for storing data generated while operating the application programs. The data memory incorporates at least one of volatile memory and non-volatile memory. Particularly, the storage unit 110 is provided with a per-orientation mode storage region 111 for storing preset modes corresponding to orientations of the mobile phone 100 and a per-mode key sequence storage region 113 for storing key sequences mapped to corresponding to the orientations in the form of a table. Preferably, the per-mode key sequence storage region 113 stores the key sequences preset in manufacturing stage of the mobile terminal 100. The per-mode key sequence region 113 can be modified and stored by user's key manipulations.

Figure 4:
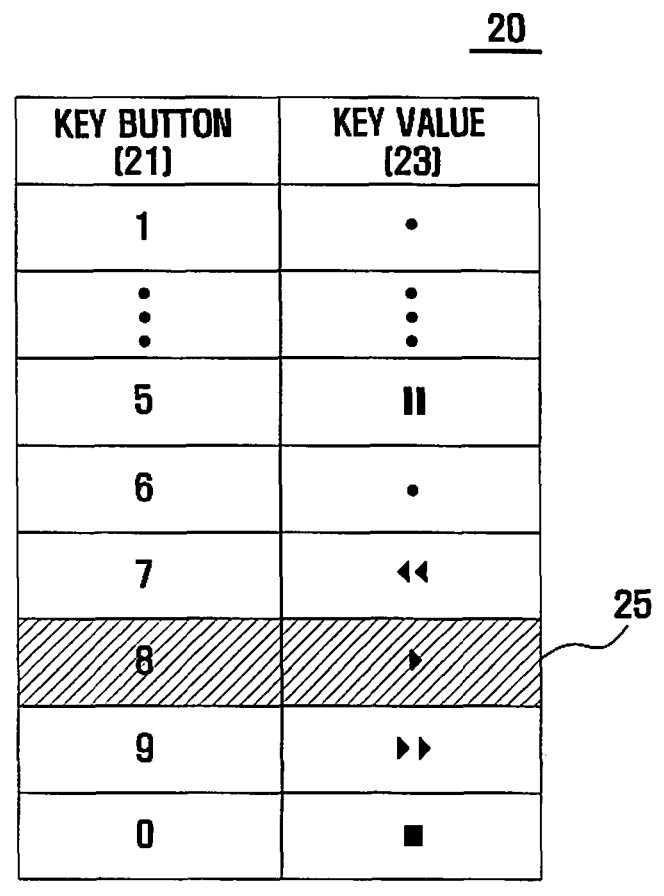

The per-mode key sequence storage region 113 can be stored in the form of a key mapping table exemplary depicted in FIG. 4. The per-mode key sequence mapping table 20 is composed of a key field 21 listing keys and sequence value field 23 listing key sequences corresponding to the keys. For example, a recode 25 of the key mapping table 20 shows that the number key "8" is mapped to a key sequence implying " ▸ ".

The orientation detection unit 120 detects an orientation of the mobile terminal 100. Particularly, the orientation detection unit 120 includes an acceleration sensor 121 for sensing an accelerated motion of the mobile terminal 100 and an orientation calculator 123 for calculating the orientation of the mobile terminal 100 on the basis of the accelerated motion. The orientation detection unit 120 is described with reference to FIG. 2 later.

The orientation retrieval unit 130 compares a current orientation detected by the orientation detection unit 120 and references orientations previously stored in the storage unit 110, and generates a mode signal corresponding to a retrieved reference orientation. At this time, the orientation retrieval unit 130 compares the currently detected orientation of the mobile terminal with all reference orientations store in the storage unit 110 and retrieves a reference orientation matching the currently detected orientation. Moreover, the reference orientations are represented by different mode signals.

In particular, the orientation retrieval unit 130 determines if the stored orientation of the mobile terminal 100 is identical with the detected orientation of the mobile terminal 100 by the orientation detection unit 120. If the stored orientation of the mobile terminal 100 is identical with the detected orientation of the mobile terminal 100, the orientation retrieval unit 130 generates a mode signal by selecting a mode corresponding to the detected orientation by the storage unit 110.

The key arrangement configuration unit 140 receives a mode signal and searches a corresponding key configuration from the storage unit 110 and reconfigure the key arrangement suitable for the operation mode of the mobile terminal 100. For example, when the mobile terminal 100 operates in the multimedia mode, the number key "8" is reset to generate a key sequence for playback of a multimedia file, although it is used only for input a digit of a phone number in the communication mode.

The control unit 150 controls general operations of the mobile terminal 100. The control unit 150 can be implemented with a microprocessor and a Digital Signal Processor (DSP). Particularly, the control unit 150 determines the orientation of the mobile terminal 100 on the basis of the orientation information collected by the orientation detection unit 120 in predetermined time duration, and transmits the orientation information to the orientation retrieval unit 130 if the orientation of the mobile terminal 100 is maintained in the predetermined time duration. Preferably, the time duration is about 1 second. Also, it is possible that the control unit 150 comprises the orientation retrieval unit 130.

The control unit 150 determines a screen image rotation angle in accordance with the retrieval result of the orientation retrieval unit 130 in an operation mode. In operation, if a vertical raising motion of the mobile terminal relative to the earth is set for audio playback mode and the mobile terminal is vertically raised, the mobile terminal 100 enters the audio playback mode and displays the screen image of the audio playback mode adaptive to a rotational motion of the mobile terminal 100. For example, the control unit 150 controls the display unit 160 to display the screen image of the audio playback mode in a reserve image.

The display unit 160 displays the operation status and information of the mobile terminal 100. Particularly, the display unit 160 is implemented to display the screen image such that the screen image rotates at an angle in accordance of the rotational motion of the mobile terminal. Also, the display unit 160 displays the key sequence corresponding to the orientation of the mobile terminal 100 under the control of the key arrangement configuration unit 140. This is to notify the change of the key arrangement according to the operation mode switching.

The input unit 170 is provided with a plurality of alphanumeric keys and various function keys for executing corresponding functions. The input unit 170 generates key sequences in response to the key input manipulation and transfers the key sequences to the control unit 150. The input unit 170 can be implemented with various devices such as keypad, touch-screen, and touch-pad.

The input unit 170 received user commands by means of the key sequences configured for the current operation mode of the mobile terminal 100. At this time, the input unit 170 can highlight at least two key sequences available in the current key arrangement by turning on and off Light Emission Display (LED) members provided with the keys.

The RF unit 180 is a transceiver circuit responsible for radio communication with a base station. The RF unit 180 receives and transmits the radio frequency signal through an antenna.

Figure 2:
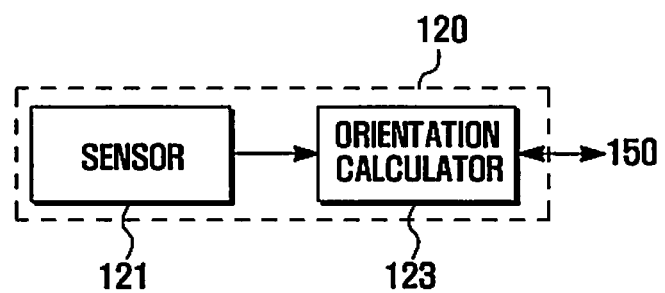
FIG. 2 is a block diagram illustrating a configuration of the orientation detection unit of the mobile terminal of FIG. 1.
Figure 3:
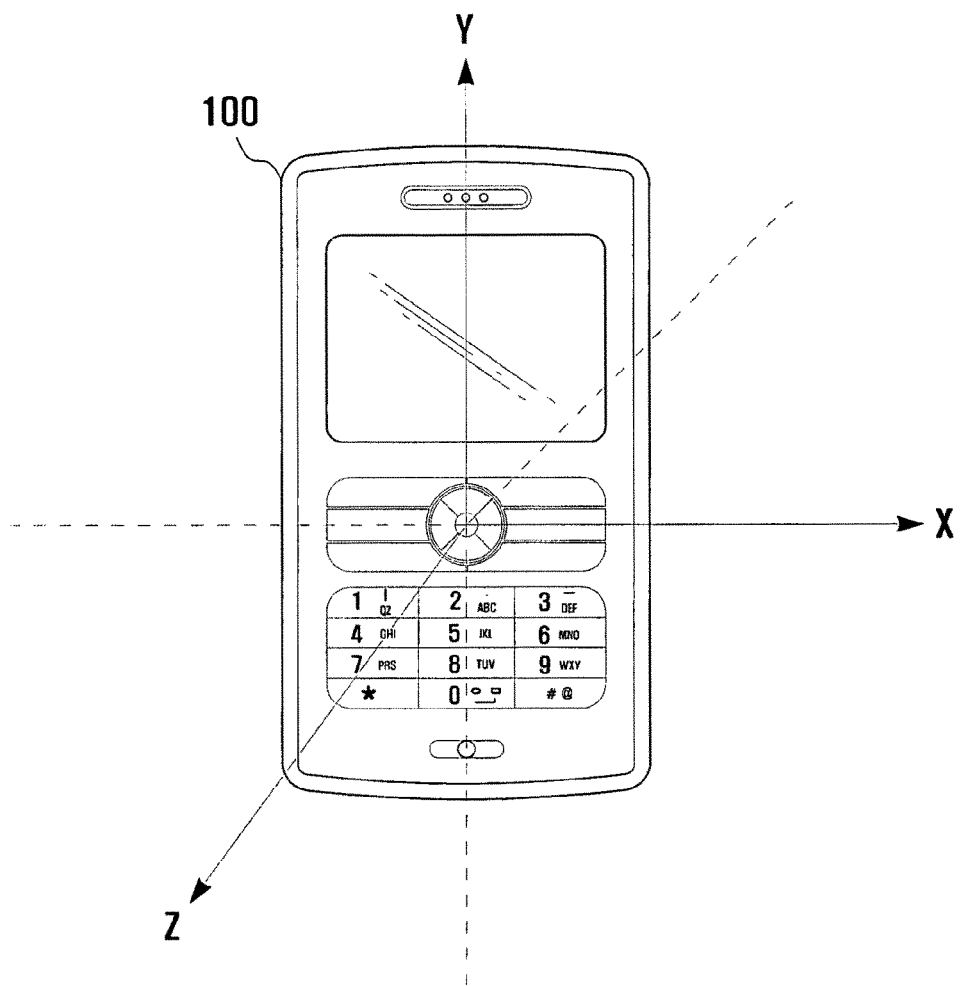
FIG. 3 is a front view illustrating a mobile terminal equipped with a sensor according to the present invention.

FIG. 2 is a block diagram illustrating a configuration of the orientation detection unit of the mobile terminal of FIG. 1.

In FIG. 2, the orientation detection unit 120 includes a gravitational acceleration sensor 121 for sensing the gravitational accelerated motion of the mobile terminal 100 and an orientation calculator 123 for calculating the orientation of the mobile terminal 100 on the basis of the accelerated motion.

The sensor acceleration sensor 121 detects an accelerated motion of the mobile terminal 100 and converts the accelerated motion into an electrical signal. The electrical signal is transferred to the orientation calculator 123. The acceleration sensor 121 can be implemented with a 3-axis acceleration sensor. In this case, the sensor 121 detects gravitational accelerations in X, Y, and Z axes when there is no motion in the mobile terminal 100. When the mobile terminal 100 is in a motion, the sensor detects the acceleration velocity obtained with the motion acceleration and the gravitational acceleration.

In this embodiment, it is assumed that the direction in which a input unit 170 of the mobile terminal is oriented is a negative Y direction and the direction in which the display unit of the mobile terminal is oriented is a positive Y direction, when the mobile terminal is positioned such that its longitudinal axis is in parallel with a gravitation line.

Figure 9A:
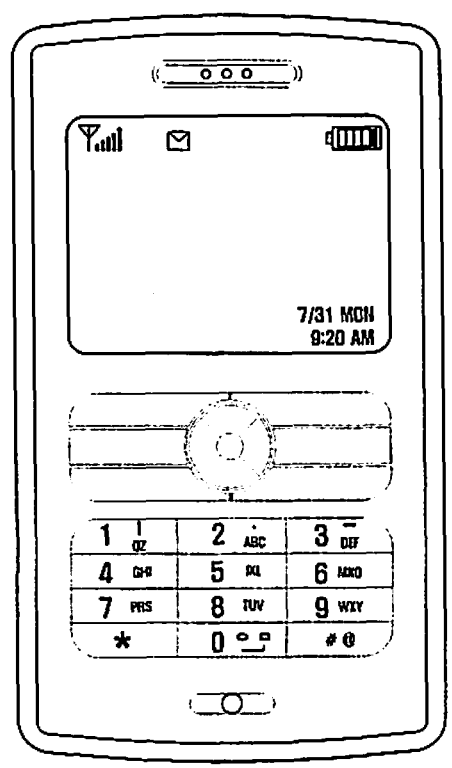
FIGS. 9A and 9B are drawings illustrating mode steps of a mode switching method according to the present invention.

As shown in FIG. 9A, when the display unit of the mobile terminal 100 is oriented to the positive Y direction, i.e. in vertical with the surface of the earth, the acceleration speed is 0 m/sec$^2$ in X and Z axes and 9.8 m/sec$^2$ in Y axis.

Figure 9B:
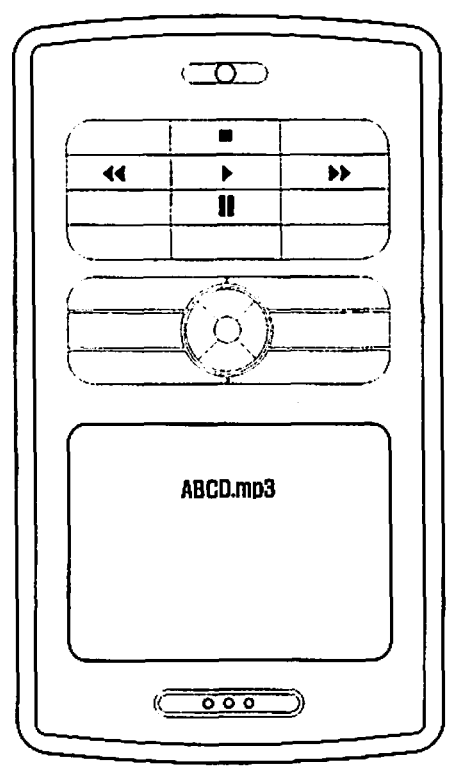

As shown in FIG. 9B, when the input unit 170 of the mobile terminal 100 is oriented to the positive Y direction, the acceleration speed is 0 m/sec$^2$ in X and Z axes and −9.8 m/sec$^2$ in Y axis.

In operation, when the mobile terminal is positioned such that its longitudinal direction forms an angle with the gravitation line, the acceleration speeds 3 axes become non-zero values. In this case, a value obtained by taking a root on the sum of the acceleration components at the 3 axes, i.e., the sum of vectors becomes 9.8 m/sec$^2$. In this case, the gravitation sensor 130 detects the acceleration in X, Y, and Z axis directions. The detected acceleration a can be express as Equation (1):

$$a=[a_x,a_y,a_z]^T \quad (1)$$

where $a_x$, $a_y$, and $a_z$ are accelerations in X, Y, and Z axis directions.

The axes and gravitational acceleration at each axis can be changed according to a position of the acceleration sensor on the mobile terminal 100.

The orientation calculator 123 calculates the orientation of the mobile terminal on the basis of the acceleration detected by the acceleration sensor 121.

Particularly, when the gravitational acceleration is composed of more than one axis component, the orientation calculator 123 determines the orientation of the mobile terminal on the basis of the respective axis components. That is, the orientation calculator 123 calculates angles of the axes relative to the mobile terminal 100 and calculates an orientation of the mobile terminal 100 on the basis of the angles of the axes. The orientation is defined by a roll angle, pitch angle, and yaw angle that are expressed by Φ, θ, and Ψ. The roll angle is a rotation angle on the axis of X, and the pitch angle is a rotation angle on the axis Y, and the yaw angle is a rotation angle on the axis of Z.

As shown in FIG. 2, if the gravitational acceleration on the axis of Y is 9.8 m/sec$^2$, among the acceleration components detected by the acceleration sensor 121, the orientation calculator 123 recognizes that the values of the roll and yaw angles are "0 s", which means that the mobile terminal is positioned such that its longitudinal axis is in parallel with the gravitation line. The orientation calculator 123 can detect all orientations of the mobile terminal is such manner.

The orientation calculator 123 can be separately implemented or integrated into the sensor 121.

Figure 5:
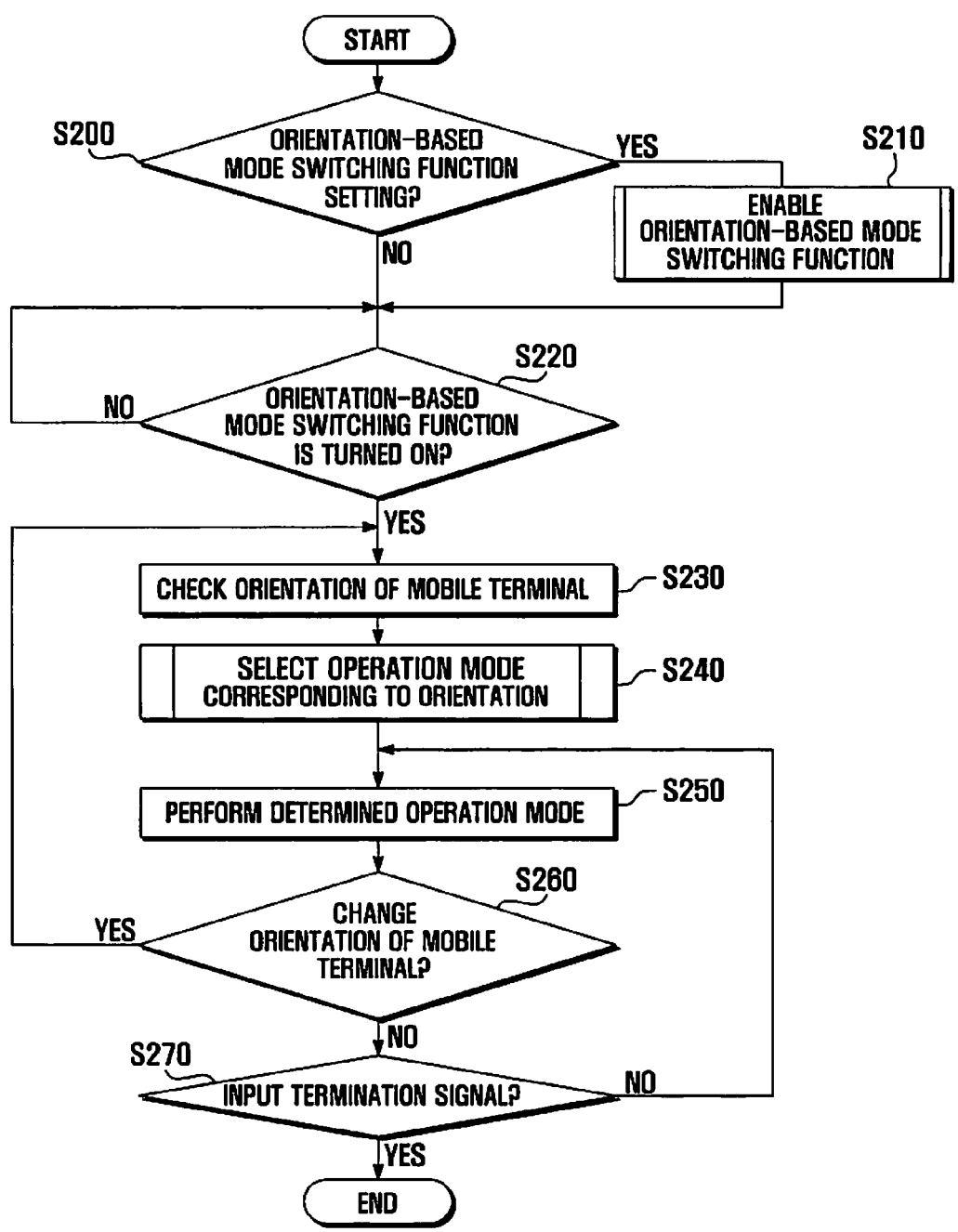
FIG. 5 is a flowchart illustrating a mode switching method according to the present invention.

FIG. 5 is a flowchart illustrating a mode switching method according to the present invention.

In FIGS. 1 and 5, the control unit 150 determines whether a user command for activating an orientation-based mode switching is input in step S200. If a user command for activating an orientation-based mode switching function, the control unit 150 configures the orientation-based mode switching function in accordance with user's manipulation. A procedure for configuring the orientation-based mode switching function is described below with reference to FIG. 6.

In contrast, if no user command for activating an orientation-based mode switching function is input, the control unit 150 determines whether the orientation-based mode switching function is enabled in step S220. If the orientation-based mode switching function is enabled, the control unit 150 checks a current orientation of the mobile terminal, detected by the orientation detection unit 120 in step S230. As described above, the orientation detection unit 120 includes the acceleration sensor and the orientation calculator. The acceleration sensor 121 senses the acceleration of the mobile terminal 100 and generates a corresponding electrical signal. The signal is transferred to the orientation calculator 123 such that the orientation calculator 123 calculates the orientation of the mobile terminal on the basis of the signal. The acceleration sensor 121 is a 3-axis acceleration sensor for sensing the gravitational acceleration in X, Y, and Z axes in accordance with the motion of the mobile terminal. The acceleration sensor 121 can detect the movement acceleration and the gravitational acceleration of the mobile terminal 100. In the case, however, that the mobile terminal is not moved, the acceleration sensor 121 detects only the gravitational acceleration. The orientation calculator 123 can calculate the orientation of the mobile terminal 100 on the basis of the acceleration detected by the acceleration sensor 121.

After checking the current orientation of the mobile terminal 100, the control unit 150 determines an operation mode corresponding to the current orientation of the mobile terminal 100 in step S240. The operation mode determination procedure is described below with reference to FIG. 7.

Next, the control unit 150 performs the determined operation mode in step S250 and determines whether the orientation of the mobile terminal 100 is changed on the basis of the information received from the orientation detection unit 120 in step S260.

When there is no change in the orientation of the mobile terminal 100, the control unit 150 determines whether a termination signal is input in step S270. If there is no termination signal is input, the control unit 150 proceeds to step S240.

Figure 6:
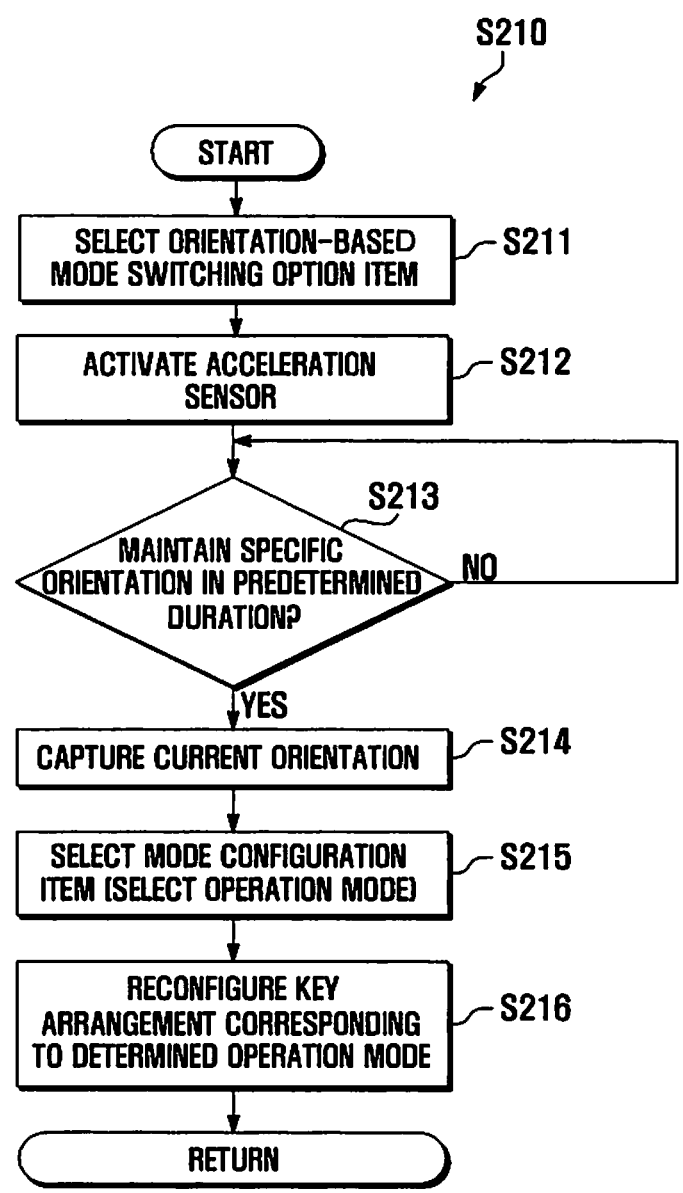
FIG. 6 is a flowchart illustrating the orientation-based mode switching function configuration process as described with respect to FIG. 5.

FIG. 6 is a flowchart illustrating the orientation-based mode switching function configuration procedure in step S210 of FIG. 5.

In FIGS. 1 and 6, the control unit 150 checks an orientation-based mode switching option item in accordance with a user input in step S211, and then activates the acceleration sensor in step S212. Next, the control unit 150 determines whether the mobile terminal maintains a specific orientation in a predetermined duration in step S213. If the mobile terminal maintains a specific orientation in a predetermined duration, the control unit 150 captures the orientation as a current orientation in step S214. In this embodiment, the predetermined duration is set to 1 second.

If a specific orientation of the mobile terminal 100 is not maintained in the duration, the control unit 150 repeats step S213. After capturing the current orientation of the mobile terminal 100, the control unit 150 selects a mode configuration item in accordance with a user input.

Next, the control unit 150 determines an operation mode corresponding to the current orientation in step S215 and then reconfigures the key arrangement corresponding to the determined operation mode in step S216. The operation mode and key arrangement are stored in the storage unit 110. Preferably, the key arrangement per operation mode is preset in the mobile terminal manufacture stage. The key arrangement can be modified by the user.

Figure 7:
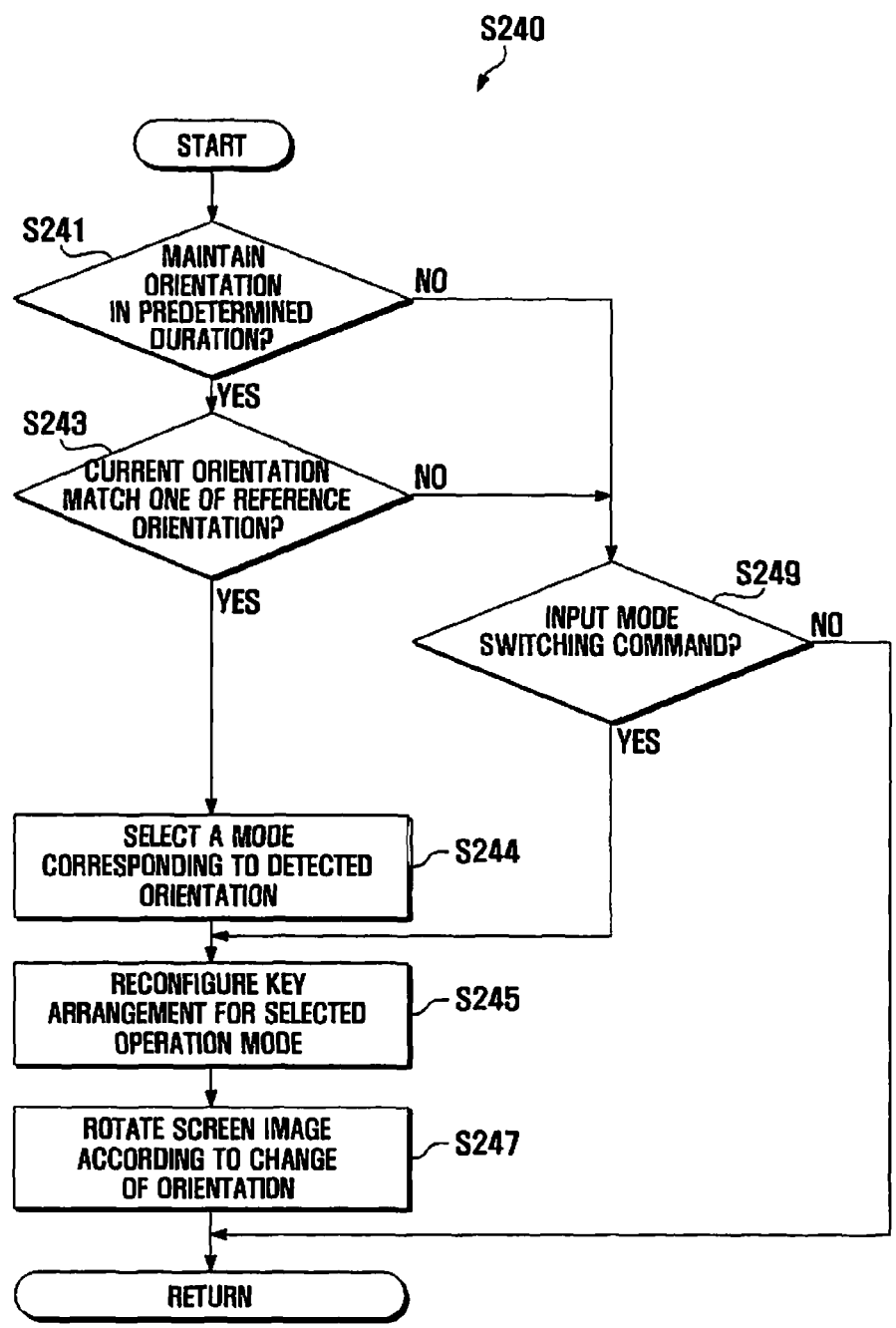
FIG. 7 is a flow chart illustrating the operation mode determination process as described with respect to FIG. 5.

FIG. 7 is a flow chart illustrating the operation mode determination process as described with respect to FIG. 5.

In FIGS. 1 and 7, the control unit 150 determines whether the orientation detected by the orientation detection unit 120 is maintained in a predetermined duration in step S241. Preferably, the predetermined duration is shorter than 1 second. The predetermined duration is used for preventing the operation mode is changed by mistake.

If the orientation is maintained in a predetermined duration, the control unit 150 determines if the previously stored reference orientation of mobile terminal 100 in the per-orientation mode storage unit is identical with the detected orientation of mobile terminal 100 by controlling the orientation retrieval unit. If the orientations of the mobile terminal 100 are identical, the control unit 150 generates a mode signal by selecting a mode corresponding to the detected orientation of mobile terminal 100 in the storage unit 110 by controlling the orientation retrieval unit 130 in step S244. The control unit 150 determines whether a reference orientation matching the current orientation exists in step S243. That is, the control unit 150 controls the orientation retrieval unit 130 to compare the current orientation with the reference orientations stored in the storage unit 110 and generates, if a reference orientation matching the current orientation exists, a mode selection signal corresponding to the matched reference orientation. Next, the control unit 150 reconfigures the key arrangement suitable for the selected operation mode on the basis of the mode selection signal in step S245.

Figure 10A:
FIGS. 10A and 10B are drawings illustrating mode steps of a mode switching method according to the present invention.
Figure 10B:
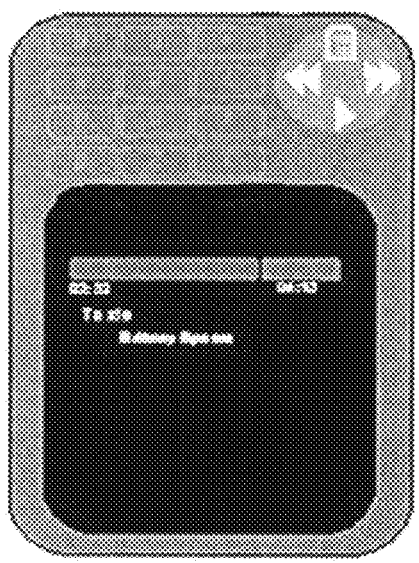

For example, in the case where the input unit 170 is implemented with a touchpad as shown in FIG. 10A, the key arrangement configuration unit 140 reconfigures the arrangement of the keys of the touchpad by turning on and off indication lights of the keys as shown in FIG. 10B. That is, if the operation mode is changed from the communication mode of FIG. 10A to the multimedia mode of FIG. 10B, the number keys enabled in the communication mode are disabled and the navigation keys disabled in the communication mode are enabled.

Figure 11A:
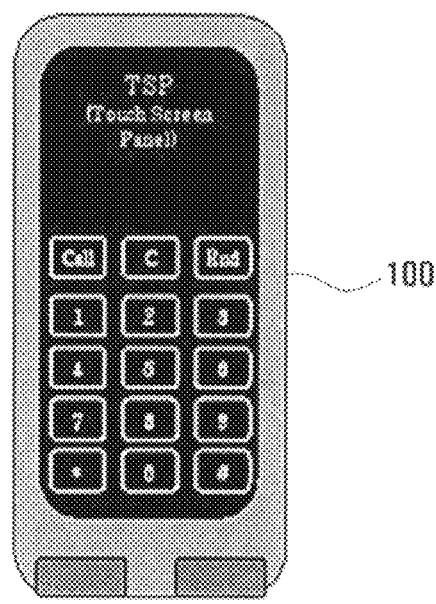
FIGS. 11A and 11B are drawings illustrating mode switching steps of a mode switching method according to the present invention.
Figure 11B:
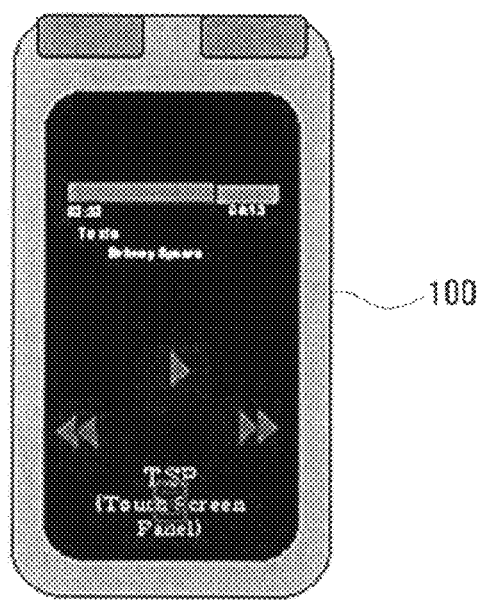

For another example, in the case where the input unit 170 is implemented with a touchscreen as shown in FIG. 11A, the key arrangement configuration unit 140 reconfigures the arrangement of the keys of the touchscreen by changing the screen image displayed by the liquid crystal display as shown in FIG. 11B. That is, when the operation mode changes from the communication mode of FIG. 11A to the multimedia mode of FIG. 11B, the number keys of the communication mode disappear and the navigation keys, not shown in the communication mode, appear.

The control unit 150 can control such that the key arrangement re-configured by the key arrangement configuration unit 140 is displayed on the display unit 160 for notifying a user of the change of the key arrangement in accordance with the mode switching.

For another example, in the case where the input unit 170 is implemented with a touchscreen as shown in FIG. 11A, the key arrangement configuration unit 140 reconfigures the arrangement of the keys of the touchscreen by changing the screen image displayed by the liquid crystal display as shown in FIG. 11B.

After reconfiguring the key arrangement, the control unit 150 rotates the screen image according to the change of the orientation of the mobile phone 100 in step S247. For example, if the orientation of the mobile terminal 100 in FIG. 9A is changed so as to be upside down as shown in FIG. 9B, the screen image is also reversed.

At step S241, if the orientation of the mobile terminal 100 is not maintained in the predetermined duration, the control unit 150 determines whether a user command for switching the operation mode is input in step S249. If a mode switching command is input, the control unit 150 performs step S245.

On the other hand, if no mode switching command is input, the control unit 150 maintains the current operation mode.

At step S243, if there is no operation mode registered for the current orientation of the mobile terminal 100, the control unit 150 performs step S249. Also, the control unit 150 can control such that the mobile terminal operates in a default mode when there is no operation mode matching the current orientation of the mobile terminal. The default mode may be the communication mode.

FIG. 8 is a flowchart illustrating a mode switching method according to the present invention.

In FIGS. 1 and 8, the control unit 150 determines whether the mobile terminal operates in a multimedia mode in step S300. Here, the control unit 150 controls the orientation detection unit 120 detect the orientation of the mobile terminal 100 using the acceleration sensor 121. The orientation detection unit 120 compares the detected orientation with the reference orientations stored in the storage unit 110 and generates, if there is a reference orientation matching the detected orientation, a mode signal corresponding to the matched reference orientation. If it is determined that the operation mode indicated by the mode signal is the multimedia mode, the control unit 150 switches the operation to the multimedia mode in step S310.

While operating in the multimedia mode, the control unit 150 determines whether an incoming call event occurs in step S320. If an incoming call event occurs, the control unit 150 determines whether the orientation of the mobile terminal 100 is a communication mode orientation in step S330. If the orientation of the mobile terminal 100 is not the communication mode orientation, the control unit 150 checks a reaction event in response to the incoming call event in step S340. If the reaction event is an incoming call acceptance event, the control unit 150 switches the operation mode from the multimedia mode to the communication mode in step S350 and processes the incoming call event in step S355. For example, if the incoming call event is a voice communication request event, the control unit 150 switches the operation event from the multimedia mode to the communication mode and displays information on the incoming call. If the incoming call event is a message reception event, the control unit 150 displays a content of the received message.

If the orientation of the mobile terminal 100 is the communication mode orientation at step S330, the control unit 150 skips step S350 and processes the incoming call event in step S355.

If it is determined that the reaction event is an incoming call rejection event at step S340, the control unit 150 maintains the multimedia mode and stops processing the incoming call event in step S365. For example, if the incoming call event is a voice communication request event, the control unit 150 processes the incoming call as an "incoming call in absence" and transmits an automated response message, while maintaining the multimedia mode. If the incoming call event is a message reception event, the control unit 150 outputs only an alert for notifying of a reception of a message while maintaining the multimedia mode.

Next, the control unit 150 monitors a user command and determines, if a user command is input, whether the user command is for an operation mode termination command in step S370. If the user command is not an operation mode termination command, the control unit 150 performs an operation corresponding to the user command. In this case, the current operation mode is maintained, i.e. the communication mode is maintained when the operation mode is switched to the communication mode at step S350 or the multimedia mode is maintained when the multimedia mode is maintained at step S360. If the orientation of the mobile terminal 100 is changed while the mobile terminal 100 operates is the current operation mode, the control unit 150 switches the current operation mode to another operation mode corresponding to the changed orientation of the mobile terminal 100.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the mode switching method for a mobile terminal according to the present invention is advantageous since the mode switching is performed in association with a change of an orientation of the mobile terminal.

Also, the mode switching method for a mobile terminal according to the present invention re-configures a key arrangement in accordance with an operation mode of the mobile terminal, resulting in convenient key manipulation per operation mode.

What is claimed is:

1. A mobile terminal comprising:
   a display;
   an orientation detection unit;
   a storage unit which stores a plurality of reference orientations and, for each of the plurality of reference orientations, a corresponding operation mode, wherein a corresponding operation mode for at least one of the plurality of reference orientation is selected by a user input; and
   a control unit which:
   determines a reference orientation among the plurality of stored reference orientations which corresponds to a current orientation detected by the orientation detection unit;
   identifies an operation mode corresponding to the determined reference orientation; and
   switches to the identified operation mode if currently in another operation mode, and configures the display to display a screen with an orientation corresponding to the current orientation detected by the orientation detection unit.

2. A method for a mobile terminal, comprising:
   storing a plurality of reference orientations and, for each of the plurality of reference orientations, a corresponding operation mode, wherein a corresponding operation mode for at least one of the plurality of reference orientations is selected by a user input;
   detecting an orientation of the mobile terminal using an orientation detection unit;
   determining a reference orientation among the plurality of stored reference orientations which corresponds to a current orientation detected by the orientation detection unit;
   identifying an operation mode corresponding to the determined reference orientation; and
   switching to the identified operation mode if currently in another operation mode, and configuring the display to display a screen with an orientation corresponding to the current orientation detected by the orientation detection unit.

* * * * *